United States Patent [19]

Barr, Jr. et al.

[11] Patent Number: 4,873,675

[45] Date of Patent: Oct. 10, 1989

[54] METHOD AND APPARATUS FOR SEISMIC EXPLORATION OF STRATA SURROUNDING A BOREHOLE

[75] Inventors: Frederick J. Barr, Jr., Houston; Thomas R. Beasley, Katy; Richard H. Piggin, Fort Worth, all of Tex.

[73] Assignee: Halliburton Logging Services, Inc., Houston, Tex.

[21] Appl. No.: 205,291

[22] Filed: Jun. 10, 1988

[51] Int. Cl.$^4$ ............................ G01V 1/40; G01V 1/20
[52] U.S. Cl. ...................................... 367/57; 367/912; 181/106
[58] Field of Search ............... 181/102, 104, 106, 121, 181/401; 367/25, 55, 57, 911, 912; 166/249, 210; 175/1, 40, 50

[56] References Cited

U.S. PATENT DOCUMENTS

| | | | |
|---|---|---|---|
| 3,845,837 | 11/1974 | McEvers et al. | 181/102 |
| 4,003,017 | 1/1977 | Barley | 367/921 |
| 4,144,949 | 3/1979 | Silverman | 181/106 |
| 4,207,619 | 6/1980 | Klaveness | 181/106 |
| 4,363,112 | 12/1982 | Widrow | 367/30 |
| 4,365,321 | 12/1982 | von Bose | 367/25 |
| 4,365,322 | 12/1982 | Widrow | 181/106 |
| 4,701,892 | 10/1987 | Anderson | 367/912 |
| 4,773,501 | 9/1988 | Dedole et al. | 181/121 |

Primary Examiner—Nelson Moskowitz
Attorney, Agent, or Firm—William J. Beard

[57] ABSTRACT

A method and apparatus are disclosed for carrying out the seismic exploration of the strata which surrounds a borehole during the drilling of that borehole. A compressional mode jar mechanism is disposed in a drill string above a drill bit. Sufficient weights to cock and actuate the jar are disposed both below and above the jar mechanism respectively. A telescoping joint above the jar prevents the impact on the drill bit from propagating up the drill string and multiple geophones at the surface are utilized to receive the seismic waves generated by the impact of the drill bit within the borehole. In a preferred mode of the present invention, an additional geophone is disposed within the drill string proximate to the drill bit to detect the "first break" of the impact thus generated.

13 Claims, 2 Drawing Sheets

METHOD AND APPARATUS FOR SEISMIC EXPLORATION OF STRATA SURROUNDING A BOREHOLE

BACKGROUND OF THE INVENTION

1. Field of the Invention

This invention relates in general to the field of seismic exploration and in particular to seismic exploration which is utilized to investigate the strata surrounding a borehole. Still more particularly, the present invention relates to seismic exploration methods which utilize a seismic source which is located within a borehole.

2. Description of the Prior Art

Seismic exploration methods are well known in the prior art. Seismic exploration is normally utilized to obtain broad general information about subsurface strata. These techniques are generally implemented by utilizing an explosive or vibratory source which is disposed at multiple locations on the surface of the earth and a plurality of geophone sensors which are laid out at regular intervals near each source or "shot point".

Well logging techniques are also well known in the art and are generally utilized to obtain additional information about the strata which surround the borehole. While highly detailed information concerning porosity, permeability and other factors may be obtained by utilizing these techniques, the information is generally limited to the vicinity of the borehole.

More recently, it has been discovered that a combination of seismic exploration techniques with selected borehole measurements may be utilized to obtain more detailed information over a broader area of investigation. This technique is often referred to as Vertical Seismic Profiling (VSP), and involves the placement of geophone sensors in the borehole and the utilization of one or more shot points on the surface near the borehole. This technique can provide considerable additional information to help delineate subsurface formations and reservoirs. However, the information provided is frequently sparse and can be quite expensive to obtain.

A single source VSP setup can often take three to six hours to rig and more complex multi-offset-source setups can take several days. Drilling rig operators do not generally wish to incur the costs involved with these techniques for the amount of information received. Additionally, the high cost associated with the surface sources and recording systems can add significantly to the cost associated with this technique. It should therefore be obvious that an improved technique must be discovered that provides similar information without the high costs involved with VSP.

One approach to solving the aforementioned problem is the so-called "Inverse VSP" technique, in which the geophones are disposed on the surface of the earth and a seismic source is utilized within the borehole. Among the problems associated with this technique is the provision of a seismic source which is sufficiently repeatable and powerful for a useful acoustic wavefield to be detected at the surface and sufficiently robust to permit easy recording of the resultant seismic waves and which does not damage the borehole or the downhole equipment. If this problem can be solved, it will be possible to conduct three-dimensional surveys quite easily, due to the possibility of multiple offset and azimuth measurements which can be accomplished with this technique.

SUMMARY OF THE INVENTION

It is therefore one object of the present invention to provide an improved seismic survey method.

It is another object of the present invention to provide an improved seismic survey method which provides additional information concerning the strata surrounding a borehole.

It is yet another object of the present invention to provide an improved seismic survey method which utilizes a downhole seismic source.

It is another object of the present invention to provide an improved seismic survey method which avoids spurious seismic events arising from tube wave generation or ground roll.

It is still another object of the present invention to provide an improved seismic survey method which utilizes a downhole seismic source which does not damage the borehole or downhole equipment.

The foregoing objects are achieved as is now described. The apparatus of the present invention can be utilized to carry out seismic exploration of the strata surrounding a borehole during the drilling of that borehole. A compressional mode jar mechanism is disposed in a drill string above a drill bit. Sufficient weights to cock and actuate the jar are disposed below and above the jar mechanism respectively. A telescopic joint above the jar prevents the impact from propagating up the drill string and multiple geophones at the surface are utilized to receive the seismic waves generated by the impact of the drill bit within the borehole. In a preferred mode of the present invention, an additional geophone is disposed within the drill string proximate to the drill bit to detect the so-called "first break" of the impact thus generated.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figures 1, 2:
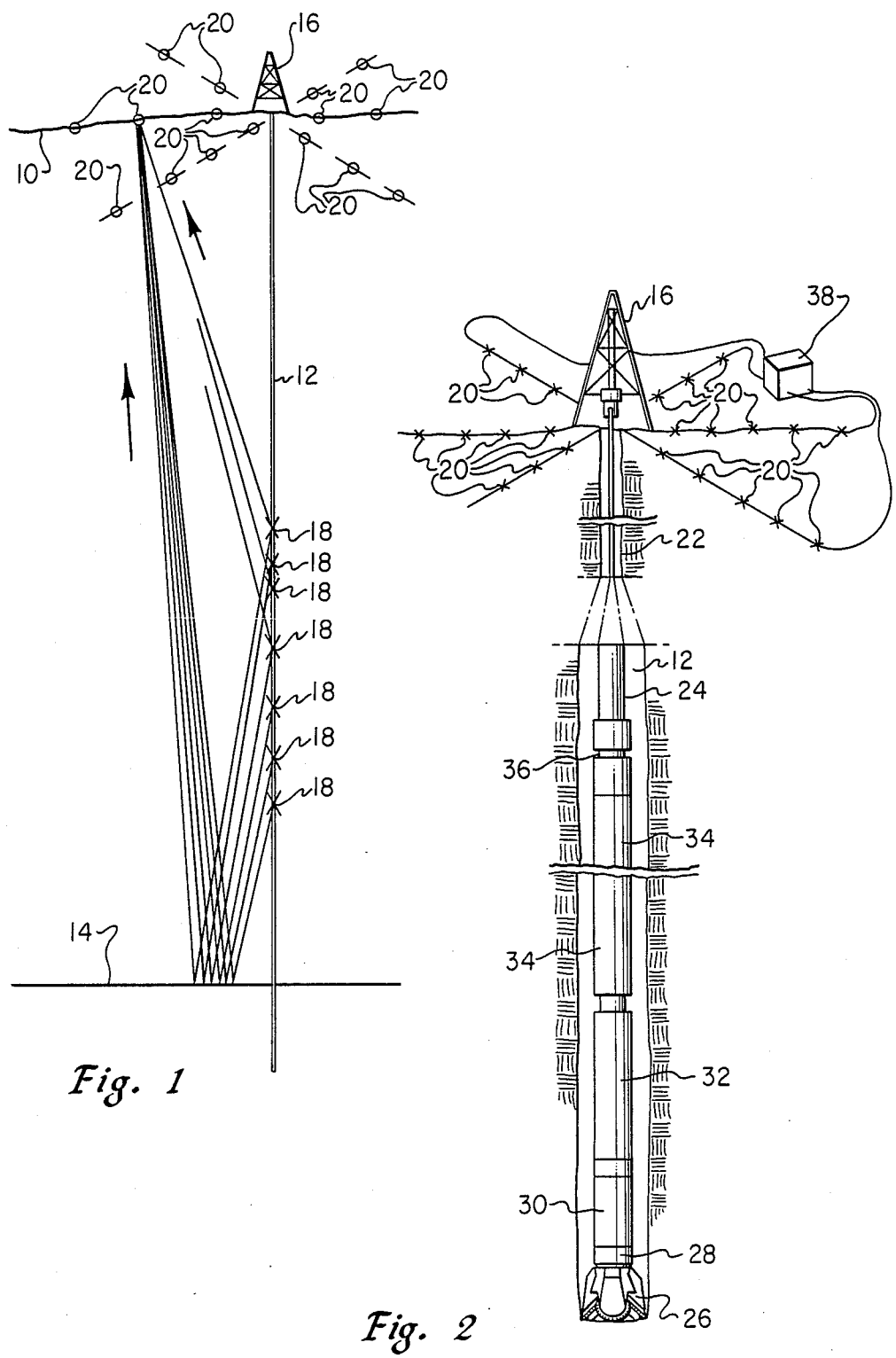
FIG. 1 is a sectional view of a portion of the earth's surface depicting the seismic exploration method and apparatus of the present invention.
FIG. 2 is a more detailed representation of the seismic exploration apparatus of the present invention.

With reference now to the figures and in particular with reference to FIG. 1, there is depicted a sectional view of a portion 10 of the earth's surface which depicts the seismic exploration method and apparatus of the present invention. As can be seen, a borehole 12 has been drilled which penetrates the earth's surface 10 through a particular strata of interest 14. As is common in the drilling of such boreholes, a length of drill string (not shown) is utilized to drive a rotary drill bit (also not shown), from drilling rig 16.

In accordance With the present invention, a plurality of shot points 18 are utilized, each representing at least one actuation of a downhole seismic source. Both the direct seismic wave generated and seismic waves reflected from the strata of interest 14 are then received at each of a plurality surface geophone receivers 20. As is typical in most seismic exploration techniques, the outputs of each surface geophone receiver 20 are then coupled to a seismic recorder (not shown), for future processing.

Referring now to FIG. 2, there is depicted a more detailed representation of the seismic exploration apparatus of the present invention. As is illustrated, drilling rig 16 serves to support a drill string 22 which preferably includes a plurality of sections of drill pipe 24. Suspended from drill string 22 and resting on the bottom of borehole 12 is drill bit 26. Drill bit 26 is preferably a three cone rotary rock bit or any other rock bit capable of withstanding the impacts generated by the method of the present invention. Testing has proven that the impacts generated by the present invention are not insubstantial; however, repeated operation of the method of the present invention revealed no visible damage to standard three cone rock bits and their associated bearings after several hundred iterations.

Next, a geophone subassembly 28 is mounted above drill bit 26. Geophone subassembly 28 preferably includes at least one geophone sensor (not shown), which is mounted in a manner which will be explained in greater detail herein. The presence of a geophone directly above drill bit 26 is utilized to record and mark the application of the impact utilized to generate seismic waves. This recording of the so-called "first break" is utilized to synchronize the reception of seismic waves at the earth's surface by surface geophone receivers 20.

Above geophone subassembly 28 is drill collar 30. In accordance with the method and apparatus of the present invention, drill collar 30, geophone subassembly 28 and drill bit 26 are designed to include sufficient weight to "cock" jar mechanism 32 when drill string 22 is lifted, suspending drill bit 26 above the bottom of borehole 12.

Jar mechanism 32 is preferably a compression mode mechanical jar, such as the Lawrence Industries Rotary Drilling Jar, manufactured by Dailey Petroleum Services, Inc., of Houston, Texas. A mechanical jar is generally a spring biased device which may be elongated or "cocked" by the suspension of a sufficient amount of weight from the lower end thereof. Once cocked, jar mechanism 32 can be made to rapidly and suddenly compress in down stroke, under the trigger pressure of a predetermined amount of weight, rapidly mating a driving hammer with an anvil (not shown), within jar mechanism 32. Jar mechanisms are well known in the art and have generally been utilized in an up stroke mode to unstick or part a drill string during removal of a stuck drill string. By utilizing a downstroke operation in the manner depicted, the present invention permits a robust impulse to be applied to drill bit 26, generating a plurality of direct and reflected seismic waves.

Disposed above jar mechanism 32 are a plurality of drill collars 34 which are preferably utilized to provide a sufficient amount of weight to assure the triggering or actuation of jar mechanism 32, once cocked. In a preferred mode of the present invention, jar mechanism 32 may be made to actuate in response to the application of a selected amount of weight which may vary between ten thousand and fifty thousand pounds. Finally, above drill collars 34 is shock absorbing joint 36. Shock absorbing joint 36 is preferably a telescoping joint which may be utilized to transmit rotary action through drill string 22 to drill bit 26, while minimizing the transmission of axial movement along drill string 22 in response to the impulse generated by jar mechanism 32.

In accordance with the depicted embodiment of the present invention, a seismic shot may be generated at any selected depth during the drilling of borehole 12 by the operation of the present invention. This operation is begun by electrically connecting surface geophone receivers 20 and geophone subassembly 28 to a seismic recorder 38. This may be accomplished as will be illustrated in greater detail below.

Next, drill string 22 is lifted upward. The weight of drill bit 26, geophone subassembly 28 and drill collar 30 will then cock jar mechanism 32, opening the assembly and spreading a driving hammer and anvil (not shown). After cocking jar mechanism 32, drill string 22 is lowered, building the weight on jar mechanism 32 to a value which approaches the preselected trigger weight which will actuate jar mechanism 32. The weight of the drill string between jar mechanism 32 and shock absorbing joint 36 is preferably chosen to be slightly less than the weight required to trigger jar mechanism 32.

At this point, seismic recorder 38 is preferably started in preparation for the firing of jar mechanism 32 and the impact thus generated. Next, further lowering of drill string 22 will cause the telescoping joint of shock absorbing joint 36 to close, thereafter increasing the weight on jar mechanism 32 to the trigger level. The downward compressional stroke of jar mechanism 32 then imparts a downward impact onto drill bit 26 which transmits the impulse into the formation at the bottom of borehole 12. Both direct and reflected seismic waves are then generated and received at each surface geophone receiver 20. The "first break" of the impulse is transmitted to the surface by utilizing geophone subassembly 28. Upon the activation of jar mechanism 32, an impulse is generated and the axial length of jar mechanism 32 is shortened by several inches. Accordingly, drill collar 34 between jar mechanism 32 and shock absorbing joint 36 will move downward by the same amount. Next, the telescoping joint of shock absorbing joint 36 will open, minimizing the axial transmission of the impulse up drill string 22. In this manner, the generation of tube waves in borehole 12 is minimized in view of the fact that drill collar 34 occupies substantially all of the borehole dimension, and since only that portion of drill collar 34 between jar mechanism 32 and shock absorbing joint 36 is subject to the impulse, there is a minimum amount of "piston" transmitting acoustic energy to the borehole fluids.

Figure 3:
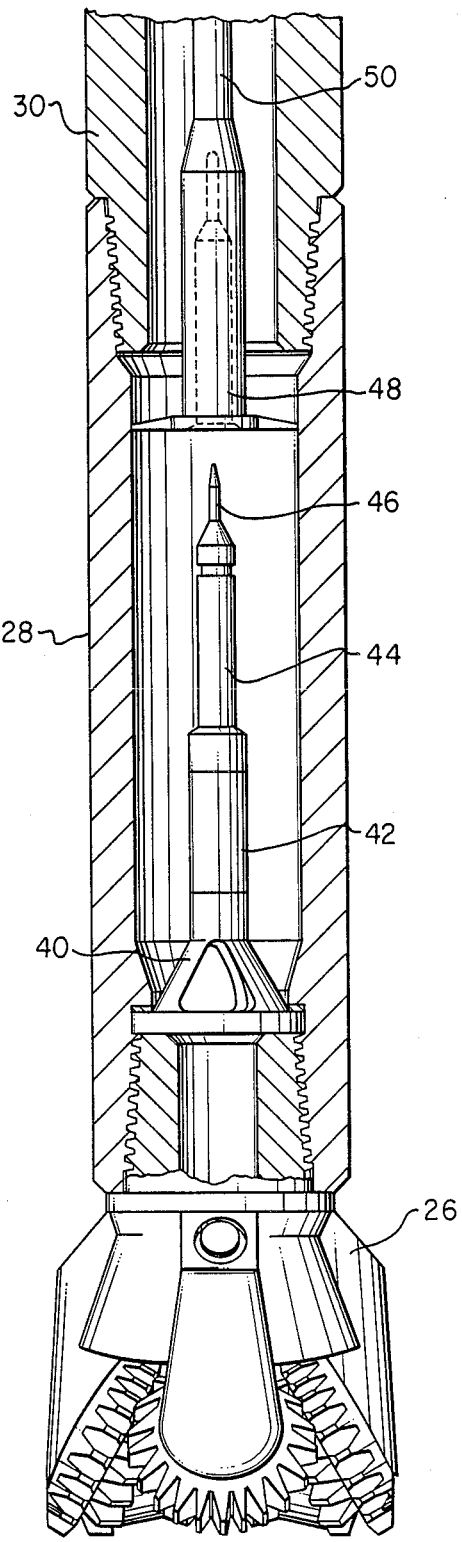
FIG. 3 is sectional view of one portion of the downhole portion of the seismic exploration apparatus of the present invention which depicts the electrical connection of the downhole geophone.

With reference now to FIG. 3, there is depicted a sectional view of the lower end of drill string 22 in accordance with the method and apparatus of the present invention. As can be seen, drill bit 26 is threaded into geophone subassembly 28 in a manner well known in the drilling art. Mounted at the joint between drill bit 26 and geophone subassembly 28 is baffle plate 40. Baffle plate 40 is preferably utilized to permit drilling fluids to pass easily through geophone subassembly 28 while serving to support geophone transducer 42.

Geophone transducer 42 is preferably a standard geophone transducer element which is electrically coupled through conduit 44 to stinger electrode 46. Stinger electrode 46 is utilized, in conjunction with latch 48, to electrically couple geophone transducer 42 to seismic recorder 38 at the earth's surface through cable $o (see FIG. 2). This is accomplished by removing the kelly (not shown) at the drilling rig or by utilizing a side entry sub to insert latch 48 into the center of drill string 22. Latch 48 is preferably a wet latch which is then pumped down through drill string 22, or lowered by the effects of gravity, until an electrical connection between latch 48 and stinger electrode 46 is made. In this manner, geophone transducer 42 may be coupled to seismic recorder 38 and the initial application of the impulse to drill bit 26 may be recorded.

In accordance with the depicted invention, it should be apparent that by utilizing the method and apparatus disclosed, it will be possible to repeatedly generate a downhole impulse signal which will result in both direct and reflected seismic wave signals which can be detected at the surface of the earth. This technique may be readily employed without substantially impairing the ability of the drilling operator to effectively and rapidly drill a borehole through the surface of the earth. As a result, the cost and effectiveness of this technique is greatly improved over known Vertical Seismic Profiling techniques.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for seismic exploration of the strata adjacent to a well borehole during drilling of that borehole, the apparatus comprising:
   (a) a drill bit disposed within a borehole at the lower end of a drill string;
   (b) a first geophone disposed supported by said drill string proximate to said drill bit;
   (c) a jar means incorporated along said drill string above said drill bit for selectively applying an impact to said drill bit;
   (d) a shock absorbing joint so incorporated along said drill spring above said jar mechanism wherein operation of said jar means creates an impact and said shock absorbing means prevents impact propagation up said drill string;
   (e) geophones operatively disposed on the surface of the earth in the vicinity of said borehole;
   (f) a seismic recording device coupled to said geophones disposed on the surface of the earth and said first geophone for recording the impact and seismic waves resultant therefrom;
   (g) mating separable electrical connectors operable in drilling fluid, one of said connectors being connected to said first geophone located in said drill string for connection with the other of said connectors; and
   (h) a cable supporting the other of said electrical connectors sufficiently long to enable electrical connection through said drill string to provide a signal from said first geophone to said seismic recording device.

2. The apparatus for seismic exploration of claim 1 further including sufficient drill collars in said drill string disposed between said jar means and said shock absorbing joint to operatively trigger said jar means.

3. The apparatus for seismic exploration of claim 1 further including a drill collar below said jar means and above said drill bit and having sufficient weight so that said drill string cocks said jar means on lifting said drill bit.

4. The apparatus or seismic exploration of claim 1 wherein said jar means is operated by cocking upwardly and a downward impact is formed on actuation of said jar means mechanism.

5. The apparatus for seismic exploration of claim 1 wherein said shock absorbing joint comprises a telescoping joint which transfers rotation.

6. An apparatus for seismic exploration of the strata adjacent to a well borehole during the drilling of that borehole, the apparatus comprising;
   (a) a drill bit disposed within a borehole at the lower end of a drill string;
   (b) a first geophone disposed supported by said drill string proximate to said drill bit;
   (c) a jar means incorporated along said drill string above said drill bit for selectively applying an impact to said drill bit;
   (d) geophones operatively disposed on the surface of the earth in the vicinity of said borehole;
   (e) a seismic recording device coupled to said geophones disposed on the surface of the earth and said first geophone for recording the impact and seismic waves resultant therefrom;
   (f) mating separable electrical connectors operable in drilling fluid, one of said connectors being connected to said first geophone located in said drill string for connection with the other of said connectors; and
   (g) a cable supporting the other of said electrical connectors sufficiently long to enable electrical connection through said drill string to provide a signal from said first geophone to said seismic recording device.

7. The apparatus for seismic exploration of claim 6 further including sufficient drill collars disposed above said jar means to operatively trigger said jar means.

8. The apparatus for seismic exploration of claim 6 further including a drill collar below said jar mechanism and above said drill bit and having sufficient weight so that said drill string cocks said jar means on lifting said drill bit.

9. A method of seismic exploration of the strata adjacent to a well borehole during rotary drilling of that borehole, the method comprising the steps of:
   (a) assembling a drill string having a drill bit at the bottom, a geophone above the drill bit, a telescoping jar means, sufficient drill collars and drill pipe to extend to the top of the well wherein sufficient weight is placed on the jar means for operation thereof;
   (b) drilling the borehole with the drill string to a first impact depth;
   (c) after drilling the borehole to an impact depth, then extending an electrical conductor cable along the drill string to make an electrical connection to the geophone for providing a signal at the surface for recording;
   (d) lifting the drill string until said jar means is cocked;

(e) lowering the drill string to trigger operation of the jar means to generate an impact downwardly on the drill string; and (f) recording from a plurality of locations the seismic waves generated by the impact.

10. The method of claim 9 including the subsequent steps of removing the cable from connection with the geophones and the drill string, and thereafter drilling the borehole to a deeper impact depth.

11. The method of claim 10 including repeating steps (c), (d), (e) and (f).

12. The method of claim 11 including repeating the steps of claim 10.

13. The method of claim 12 including the steps of preventing impact propagation up the drill string to the surface.

* * * * *